US010461616B2

(12) United States Patent
Lichtinger et al.

(10) Patent No.: US 10,461,616 B2
(45) Date of Patent: *Oct. 29, 2019

(54) ROTOR, METHOD FOR PRODUCING A ROTOR, ASYNCHRONOUS MACHINE, AND VEHICLE

(71) Applicant: Bayerische Motoren Werke Aktiengesellschaft, Munich (DE)

(72) Inventors: Josef Lichtinger, Munich (DE); Holger Ulbrich, Munich (DE); Manfred Siegling, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/001,097

(22) Filed: Jun. 6, 2018

(65) Prior Publication Data

US 2018/0287472 A1    Oct. 4, 2018

Related U.S. Application Data

(63) Continuation of application No. PCT/EP2016/076333, filed on Nov. 2, 2016.

(30) Foreign Application Priority Data

Dec. 8, 2015 (DE) .................. 10 2015 224 577

(51) Int. Cl.
*H02K 17/16* (2006.01)
*H02K 15/00* (2006.01)

(52) U.S. Cl.
CPC ....... *H02K 17/165* (2013.01); *H02K 15/0012* (2013.01)

(58) Field of Classification Search
CPC .................. H02K 17/165; H02K 15/0012
See application file for complete search history.

(56) References Cited

U.S. PATENT DOCUMENTS

| 4,309,635 A | 1/1982 | Sei et al. |
| 5,419,217 A | 5/1995 | Umezawa et al. |

(Continued)

FOREIGN PATENT DOCUMENTS

| CN | 102318169 A | 1/2012 |
| CN | 102651592 A | 8/2012 |

(Continued)

OTHER PUBLICATIONS

International Search Report (PCT/ISA/210) issued in PCT Application No. PCT/EP2016/076333 dated Jan. 26, 2017 with English translation (seven pages).

(Continued)

*Primary Examiner* — Dang D Le
(74) *Attorney, Agent, or Firm* — Crowell & Moring LLP (57) ABSTRACT

A rotor for an asynchronous machine has a laminated core and a short-circuit cage at least partially integrated in the laminated core. The short-circuit cage is designed with rods having or consisting of a first electrically conductive material and short-circuit rings having or consisting of a second electrically conductive material. At least one of the short-circuit rings is designed with a support ring, and each support ring is designed as a structure interlockingly and/or integrally cast onto or into the associated short-circuit ring.

8 Claims, 4 Drawing Sheets

(56) References Cited

U.S. PATENT DOCUMENTS

| | | | |
|---|---|---|---|
| 5,952,764 A * | 9/1999 | Nakamura | B22D 19/0054 310/211 |
| 7,174,806 B2 * | 2/2007 | Brackett | F16F 15/315 165/185 |
| 2004/0113508 A1 * | 6/2004 | Yasuhara | H02K 15/0012 310/211 |
| 2007/0247015 A1 | 10/2007 | Dellinger | |
| 2011/0316380 A1 | 12/2011 | Buttner et al. | |
| 2012/0217837 A1 | 8/2012 | Kleber | |
| 2012/0217838 A1 | 8/2012 | Kleber et al. | |
| 2012/0293036 A1 | 11/2012 | Kleber et al. | |
| 2013/0020899 A1 | 1/2013 | Kleber | |
| 2014/0132105 A1 * | 5/2014 | Kleber | H02K 15/0012 310/211 |
| 2014/0339950 A1 | 11/2014 | Nelson et al. | |
| 2014/0368082 A1 | 12/2014 | Barton | |
| 2015/0244234 A1 * | 8/2015 | Katsuki | H02K 17/165 310/211 |
| 2016/0352200 A1 | 12/2016 | Kaneda et al. | |

FOREIGN PATENT DOCUMENTS

| | | |
|---|---|---|
| CN | 104167879 A | 11/2014 |
| CN | 104868622 A | 8/2015 |
| DE | 88 03 915 U1 | 5/1988 |
| DE | 43 08 683 A1 | 9/1994 |
| DE | 691 04 016 T2 | 1/1995 |
| DE | 199 04 481 A1 | 8/2000 |
| DE | 102 58 029 A1 | 7/2003 |
| DE | 10 2012 208 006 A1 | 11/2012 |
| DE | 10 2013 218 473 A1 | 3/2015 |
| DE | 10 2013 221 795 A1 | 4/2015 |
| DE | 10 2015 102 420 A1 | 8/2015 |
| DE | 10 2014 208 898 A1 | 11/2015 |
| EP | 1 347 560 A1 | 9/2003 |
| EP | 2 804 297 A2 | 11/2014 |
| JP | 2004-236456 A | 8/2004 |
| JP | 2013-240234 A | 11/2013 |
| KR | 20030025702 A | 3/2003 |
| WO | WO 2013/172120 A1 | 11/2013 |
| WO | WO 2015/129421 A1 | 9/2015 |

OTHER PUBLICATIONS

German-language Written Opinion (PCT/ISA/237) issued in PCT Application No. PCT/EP2016/076333 dated Jan. 26, 2017 (seven pages).

German-language Search Report issued in counterpart German Application No. 10 2015 224 577.2 dated Oct. 18, 2016 with partial English translation (13 pages).

International Search Report (PCT/ISA/210) issued in PCT Application No. PCT/EP2016/076334 dated Jan. 26, 2017 with English translation (seven pages).

German-language Written Opinion (PCT/ISA/237) issued in PCT Application No. PCT/EP2016/076334 dated Jan. 26, 2017 (eight pages).

German-language Search Report issued in counterpart German Application No. 10 2015 224 579.9 dated Oct. 18, 2016 with partial English translation (13 pages).

International Search Report (PCT/ISA/210) issued in PCT Application No. PCT/EP2016/076516 dated Jan. 26, 2017 with English translation (seven pages).

German-language Written Opinion (PCT/ISA/237) issued in PCT Application No. PCT/EP2016/076516 dated Jan. 26, 2017 (seven pages).

German-language Search Report issued in counterpart German Application No. 10 2015 224 574.8 dated Oct. 18, 2016 with partial English translation (12 pages).

Chinese-language Office Action issued in counterpart Chinese Application No. 201680050443.9 dated Mar. 18, 2019 with English translation (15 pages).

* cited by examiner

ROTOR, METHOD FOR PRODUCING A ROTOR, ASYNCHRONOUS MACHINE, AND VEHICLE

CROSS REFERENCE TO RELATED APPLICATIONS

This application is a continuation of PCT International Application No. PCT/EP2016/076333, filed Nov. 2, 2016, which claims priority under 35 U.S.C. § 119 from German Patent Application No. 10 2015 224 577.2, filed Dec. 8, 2015, the entire disclosures of which are herein expressly incorporated by reference.

This application contains subject matter related to U.S. application Ser. Nos. 16/001,121 and 16/001,137 both entitled "Rotor, Method for Producing a Rotor, Asynchronous Machine, and Vehicle" filed on even date herewith.

BACKGROUND AND SUMMARY OF THE INVENTION

The present invention relates to a rotor, a method for producing a rotor, an asynchronous machine and a vehicle. The present invention relates, in particular, to a rotor for an asynchronous machine, a method for manufacturing a rotor for an asynchronous machine, and an asynchronous machine, in particular for a drive of a vehicle, and a vehicle, in particular a passenger car and/or a hybrid vehicle.

Asynchronous machines are used in many technical applications, in particular when providing drive to vehicles and their components. Such machines are also referred to as three-phase asynchronous machines or three-phase induction machines. In such machines, a rotor and a stator interact with one another via rotational magnetic fields, wherein in the generator mode the rotor leads the stator rotational field, and in the motor mode the rotor lags the stator rotational field.

In passive asynchronous machines, the rotor is formed by a short-circuit rotor or cage rotor. Such a rotor is composed of a laminated core, in particular of an iron laminated core with grooves formed in it, wherein the laminations are electrically insulated from one another. Rods are usually introduced into the grooves in the laminated core during the production process and electrically short-circuited by means of short-circuit rings, which can be done by way of a casting process.

It is problematic that substitution of materials in order to improve the electrical conductance values, on the one hand, and increasing the mechanical stability, on the other, cannot be carried out with known production methods, or can only be carried out with considerable additional expenditure in terms of material and energy.

The invention is based on the object of specifying a rotor for an asynchronous machine, which rotor makes the design and the operation of an asynchronous machine more reliable, without increasing expenditure during production. In addition, the invention is based on the object of specifying a corresponding production method for a rotor, an asynchronous machine and a vehicle, and correspondingly developing said method.

The object on which the invention is based is achieved according to the invention with a rotor for an asynchronous machine, a method for manufacturing a rotor for an asynchronous machine, an asynchronous machine so produced, and a vehicle with the asynchronous machine, in accordance with embodiments of the invention.

According to one aspect of the present invention, a rotor is provided for an asynchronous machine, comprising a laminated core and a short-circuit cage (also known as a "squirrel" cage) which is at least partially integrated into the laminated core. The short-circuit cage is constructed with rods made with or from a first electrically conductive material and short-circuit rings made with or from a second electrically conductive material. At least one of the short-circuit rings is constructed with a support ring, and a respective support ring is constructed as a structure which is cast onto or into the respective short-circuit ring in a positively locking and/or materially joined fashion. As result of the fact that at least one of the short-circuit rings is constructed with a support ring as a structure which is cast on or in in a positively locking and/or materially joined fashion, a particularly close and mechanically stable relationship is manufactured between the short-circuit ring and the support ring. The support ring can also be easily integrated as a cast-in or cast-on structure during a production method for the short-circuit ring on the basis of a casting process No particular or newly added working steps such as bonding, pressing or the like are necessary.

A particularly high level of mechanical stabilization of the rotor according to the invention also arises if a respective support ring is constructed entirely or partially on the outer circumference of the respective short-circuit ring and/or is entirely or partially embedded in the respective short-circuit ring.

In another embodiment of the rotor according to the invention, the relationship between the short-circuit ring and the support which stabilizes the short-circuit ring is enhanced further by constructing a respective support ring on its surface with a contour, in particular with one or more recesses and/or with one or more projections for supporting the positive locking and/or the material join with the respective short-circuit ring.

With respect to the support ring, since the electrical properties of the short-circuit ring are, depending on the positioning in relation to the short-circuit ring, not significant, the possibility is provided of a more wide-ranging selection of materials, in particular with respect to stabilizing the short-circuit ring with respect to large centrifugal forces, in particular in the case of untrue running.

Therefore, according to an alternative embodiment of the rotor according to the invention, it is provided that a respective support ring is constructed with or from a material from a group of materials which comprises metallic materials, ceramic materials and composites, in particular with or from glass materials and/or carbon fiber materials.

Alternatively, a support ring can also be constructed with or from the same material as the respective short-circuit ring.

The stabilization of the short-circuit ring or rings in mechanical terms by the use of a cast-in or cast-on support ring also permits the use of material combinations with respect to the rods and/or the short-circuit rings, particularly taking into account the respective electrical conductivity and, if appropriate, without particular focus on the mechanical stability of the short-circuit ring because according to the invention the latter is stabilized mechanically by the cast-in or cast-on support ring.

It is therefore possible, in particular, that (i) the rods are constructed in or with a cast and/or joined structure, (ii) one or more of the short-circuit rings are constructed as end rings, (iii) the first material has a higher electrical conductivity than the second material, (iv) the second material has a greater mechanical strength and/or stability than the first material, (v) the first material and/or the second material is a material from the group which comprises aluminum, copper, silver and the combinations and alloys thereof, and/or (vi) the first material is or has copper and a copper alloy, and the second material is or has aluminum or an aluminum alloy.

According to another aspect of the present invention, a method for manufacturing a rotor for an asynchronous machine is provided.

Such an asynchronous machine is constructed with a laminated core and at least one short-circuit cage which is partially integrated into the laminated core. According to the invention, in the production method, the short-circuit cage is constructed with rods which are formed with or from a first electrically conductive material, and with short-circuit rings which are formed with or from a second electrically conductive material. At least one of the short-circuit rings is constructed with a support ring, wherein a respective support ring is cast on or into the respective short-circuit ring in a positively locking and/or materially joined fashion.

In one advantageous development of the production method according to the invention, in order to achieve a particularly high level of mechanical stability, a respective support ring is entirely or partially constructed on the outer circumference of the respective short-circuit ring and/or entirely or partially embedded in the respective short-circuit ring.

The mechanical integrity between the support ring and the supported short-circuit ring can be enhanced further if, according to another preferred embodiment of the production method according to the invention, a respective support ring is constructed on its surface with a contour, in particular with one or more recesses and/or with one or more projections for supporting the positive locking and/or the material join with the respective short-circuit ring.

Material aspects can also be taken into account in order to increase the stability of the structure to be manufactured. This can be done, for example, in that, according to one preferred embodiment of the production method, a respective support ring is constructed with or from a material from the group of materials which has metallic materials, alloys, ceramic materials and composites, in particular with or from glass materials and/or carbon fiber materials, and combinations thereof.

As an alternative, a support ring can also be constructed with or from the same material as the respective short-circuit ring.

According to further alternatives of the production method according to the invention, there may be provision that (i) the rods are constructed in or with a cast and/or joined structure, (ii) one or more of the short-circuit rings are embodied as end rings, (iii) a material with a higher electrical conductivity than the second material is used as the first material, (iv) a material with a higher mechanical strength and/or stability than the first material is used as the second material, (v) a material from the group which has aluminum, copper, silver and combinations and alloys thereof is used as the first material and/or as the second material and (vi) in particular, copper or a copper alloy is used as the first material, and aluminum or an aluminum alloy is used as the second material.

The method according to the invention is configured in a particularly economical way according to one advantageous development if a respective short-circuit ring is constructed by a casting process using a mold, and at the same time a support ring or a preform of the support ring of the short-circuit ring is previously positioned in the mold and therefore also cast on or in during the casting of the short-circuit ring.

The present invention also provides an asynchronous machine, in particular for the drive and/or as a generator of a vehicle. The asynchronous machine according to the invention has a rotor according to the invention and a stator.

In addition, the present invention provides a vehicle, in particular a passenger car, a battery-operated electric vehicle and/or a hybrid vehicle. The vehicle is equipped with an asynchronous machine which is constructed according to the invention and which is constructed as part of a drive and/or a generator of the vehicle.

The asynchronous machine in accordance with the invention may also be used in any other devices as a drive and/or as a generator component, e.g. in working machines or machine tools, in particular in a circular saw, in pumps, e.g. water pumps, in hydraulic generators and wind-powered generators, and the like.

Other objects, advantages and novel features of the present invention will become apparent from the following detailed description of one or more preferred embodiments when considered in conjunction with the accompanying drawings.

DETAILED DESCRIPTION OF THE DRAWINGS

Exemplary embodiments of the invention are described in detail below with reference to FIGS. 1 to 5. Identical and equivalent as well as identically or equivalently acting elements and components are denoted by the same reference symbols. The detailed description of the denoted elements and components is not given in every case of its occurrence.

The presented features and further properties can be separated from one another in any desired form and combined with one another in any desired form without departing from the core of the invention.

Figure 1:
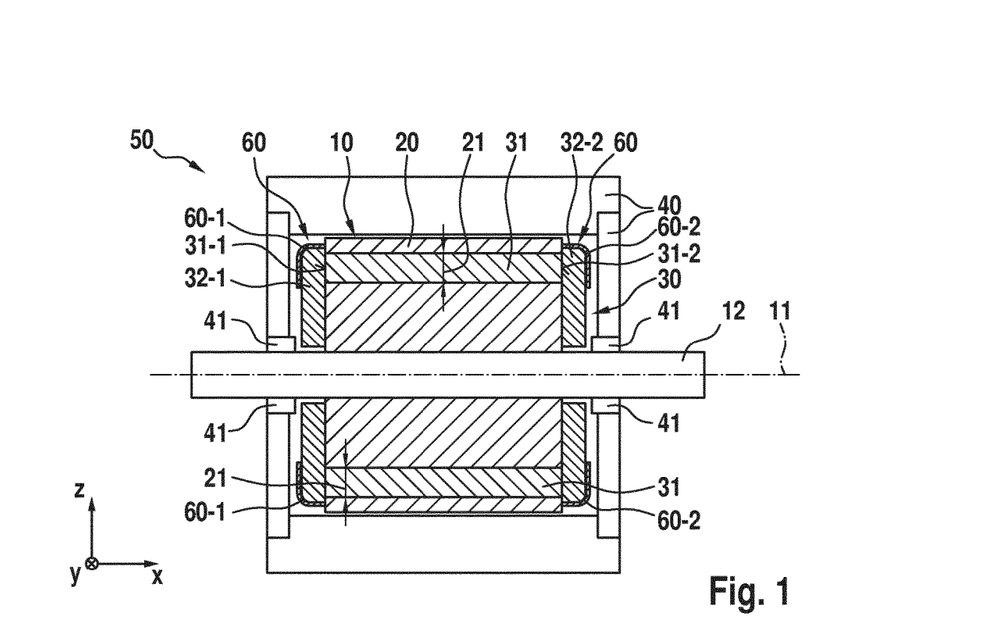
FIG. 1 is a schematic and partially sectional side view of the structure of an embodiment of an asynchronous machine according to the invention.

FIG. 1 shows a schematic and sectional side view of an embodiment of the asynchronous machine 50 according to the invention.

The asynchronous machine 50 is composed of a stator 40, in the interior of which a rotor 10 with a rotor shaft 12 is arranged mounted by way of bearings 41. The rotor shaft 12 defines a rotational axis 11 of the rotor 10. The individual components of the rotor 10 are connected in a rotationally fixed fashion to the shaft 12. The rotational axis 11, which is defined by means of the rotor shaft 12, is oriented parallel to the direction represented as the x axis in FIG. 1.

The rotor 10 comprises, in addition to the rotor shaft 12, a laminated core 20 which is formed from thin laminations which are electrically insulated from one another and are made, for example, from iron or the like. The laminated core 20 is constructed with a plurality of grooves 21 or recesses, here in the longitudinal direction parallel to the rotational axis 11, but an oblique profile is also contemplated in which the individual laminations are rotated with respect to one another through at least one inclination angle about the axis 11. The grooves 21 are equipped with rods 31, which are also referred to as cage rods. At the ends 31-1 and 31-2, the rods 31 are equipped with—here end-positioned—short-circuit rings 32-1 and 32-2, which are electrically conductive and, as a result, electrically short circuited.

In the inventive embodiment of the asynchronous machine 50 according to FIG. 1, the rotor 10 has, on the outer circumference of the first short-circuit ring 32-1, a first support ring 60-1 as part of a support ring arrangement 60.

Correspondingly, in the inventive embodiment of the rotor according to FIG. 1, the second short-circuit ring 32-2, which is also constructed as an end ring like the first short-circuit ring 32-1, has a correspondingly constructed second support ring 60-2 as part of the support ring arrangement 60 on its outer circumference.

The first and second support rings 60-1 and 60-2 are constructed according to the invention in a positively locking and/or materially joining fashion as a cast-in or cast-on structure on the respective short-circuit ring 32-1, 32-2, and in this way provide a particularly high level of stability for the short-circuit rings 32-1, 32-2 with respect to centrifugal forces during rotation of the rotor shaft 12 about the rotational axis 11.

Owing to the stabilization of the first and second short-circuit rings 32-1 and 32-2 by the support rings 60-1, 60-2 of the support ring arrangement 60, the selection of materials can be configured as desired with respect to the material of the short-circuit rings 32-1, 32-2 as long as electrical short-circuiting of the rods 31 is possible, in order, for example, to be able to allow better for aspects of a particularly lightweight and cost-effective configuration of the short-circuit rings 32-1, 32-2. Aspects of the mechanical stability of the short-circuit rings 32-1, 32-2 can be dealt with by use of the support rings 60-1, 60-2.

According to the invention it is, in particular, no longer necessary to construct the rods 31 and the short-circuit rings 32-1, 32-2 from the same material and/or in the same working step and with the same production methods.

Figure 2:
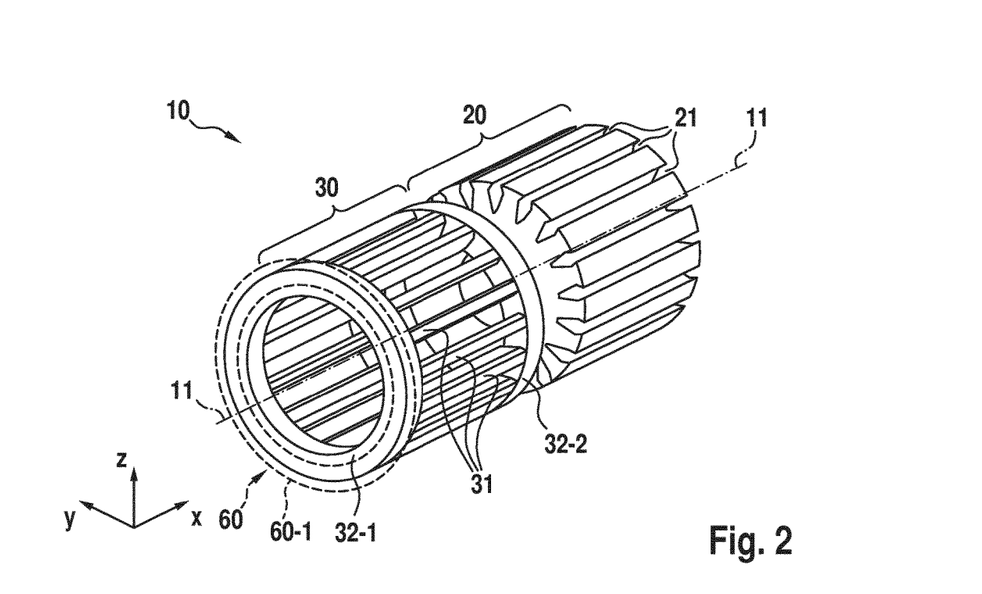
FIG. 2 is an exploded illustration of an embodiment of the rotor according to the invention which can be used as a short-circuit rotor for an asynchronous machine.

FIG. 2 shows, in the manner of an exploded illustration, an embodiment of the rotor 10 according to the invention with a short-circuit cage 30 (also known as a "squirrel" cage) with rods 31 and short-circuit rings 32-1 and 32-2 positioned at the ends, and with a laminated core 20 with grooves 21, constructed parallel to the rotor axis 11, for receiving the rods 31.

In the embodiment of the inventive rotor 10 according to FIG. 2, the laminated core 20 and the short-circuit cage 30 are shown explicitly in the exploded illustration. The support ring 60-1, to be provided according to the invention, of the support ring arrangement 60 is indicated only schematically, with a dashed contour, with respect to the first short-circuit ring 32-1.

Figure 3:
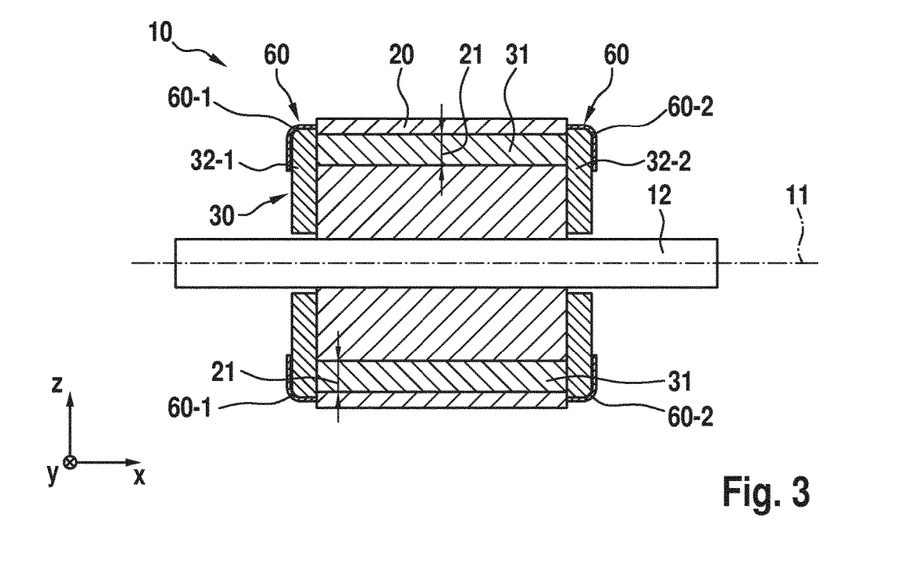
FIG. 3 is a schematic and partially sectional side view of an embodiment of the rotor according to the invention.

FIG. 3 shows a schematic and sectional side view of an embodiment of a rotor 10 according to the invention. This corresponds essentially to the rotor 10 as is used in the embodiment of the inventive asynchronous machine 50 according to FIG. 1.

The rotor axis 11 is defined by a rotor shaft 12. The further components of the rotor 10 are connected in a rotationally fixed fashion to this rotor shaft 12. This involves, in particular, a laminated core 20 with grooves 21 which are constructed parallel to the rotor axis 11 or recesses in which rods 31 of a short-circuit cage 30 are received. The rods 31 are themselves connected in an electrically conductive fashion by their first ends 31-1 on the inside of a first short-circuit ring 32-1. The second ends 31-2, lying opposite the first ends 31-1, of the rods 31 of the short-circuit cage 30 are connected in an electrically conductive fashion to the inside of an end-positioned second short-circuit ring 32-2 lying opposite.

The embodiment of the inventive rotor 10 according to FIG. 3 respectively shows a first support ring 60-1 of the support ring arrangement 60 extending around the outer circumference on the first short-circuit ring 32-1, and a second support ring 60-2 of the support ring arrangement 60 on the second short-circuit ring 32-2.

The first and second support rings 60-1 and 60-2 are arranged according to the invention on the respectively assigned short-circuit ring 32-1, 32-2 by way of a structure which is cast on or in in a positively locking and/or materially joined fashion and provide the respective short-circuit ring 32-1, 32-2 with a particularly high level of stability with respect to centrifugal forces in the case of rotation about the rotational axis 11 by means of the rotor shaft 12, in particular even in the case of untrue running.

Figure 4A:
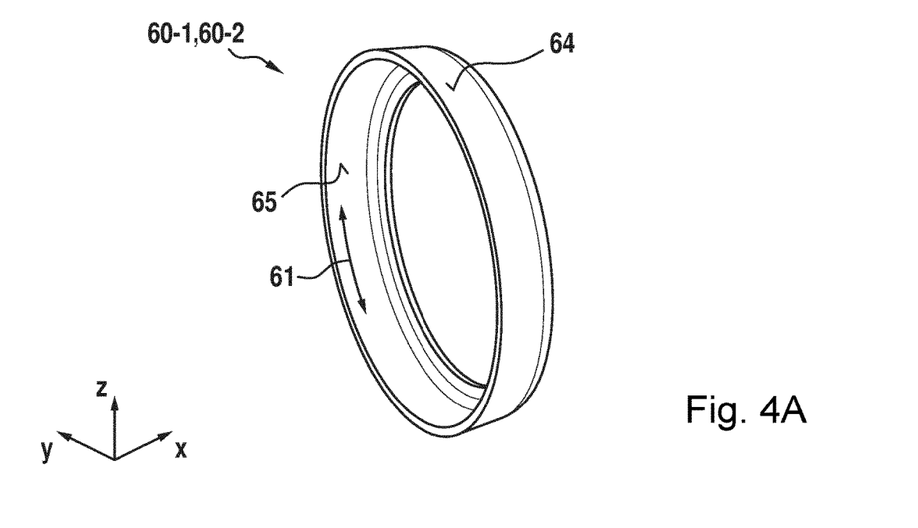
FIGS. 4A, 4B and 4C are perspective side views of three embodiments of the support rings which can be used according to the invention.
Figure 4B:
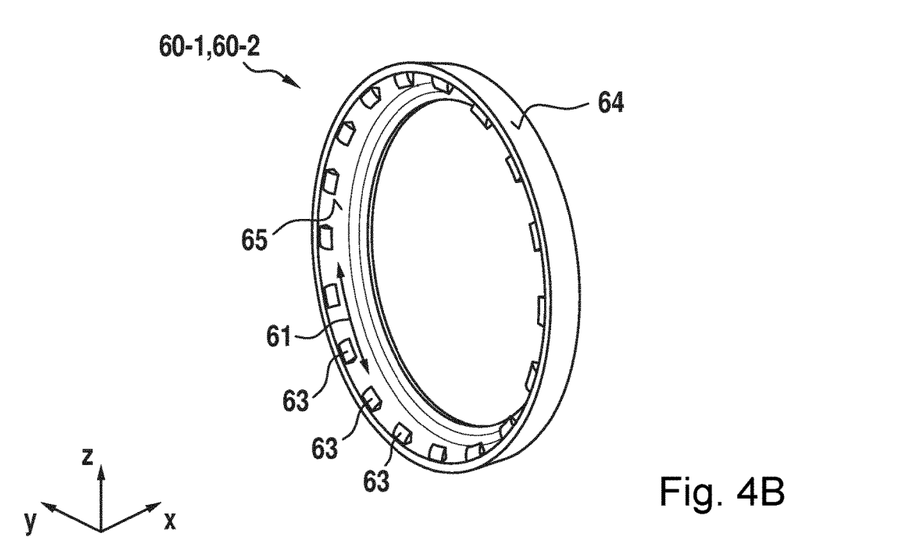
Figure 4C:
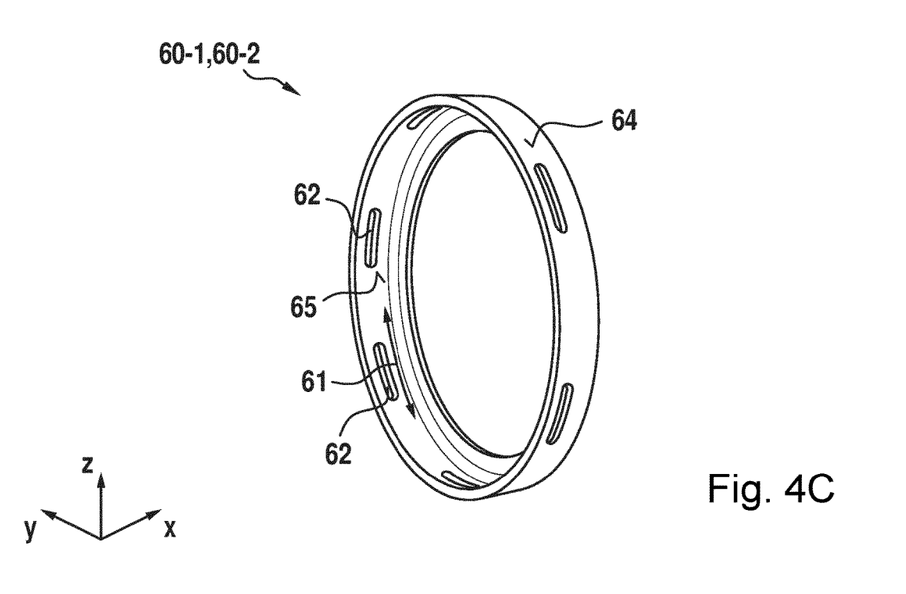

FIGS. 4A to 4C show embodiments of the support rings 60-1, 60-2 of the support ring arrangement 60 such as are used in the inventive configuration of a rotor 10 or of an asynchronous machine 50.

The support rings 60-1, 60-2 in FIGS. 4A to 4C have an annular structure with a convex outside 64 and a concave inside 65.

In order to improve the material joining and/or positive locking between a respective support ring 60-1, 60-2 and a respective short-circuit ring 32-1, 32-2, the inside 65 and/or the outside 64 can have a specific contour 61.

In the embodiment according to FIG. 4A, the support rings 60-1, 60-2 have an overall smooth contour 61 both on the outside 64 and on the inside 65.

In the embodiment according to FIG. 4B, the outside 64 is smooth, while the contour 61 of the inside 65 of the support ring 60-1, 60-2 has projections 63 which bring about an improvement in the material joining and/or, in particular, of the positive locking (interlocking) during the process of casting the respective support ring 60-1, 60-2 on and/or in the short-circuit ring 32-1, 32-3.

In the embodiment according to FIG. 4C, the per se smooth contours 61 of the outside 64 and of the inside 65 of the support ring 60-1, 60-2 are penetrated by recesses 62 or cutouts, with the result that during the casting on and/or in procedure the respective casting material can penetrate the recesses 62, in order thereby to improve the material join and/or, in particular, the positive locking (interlocking) between the respective support ring 60-1, 60-2 and the respectively assigned short-circuit ring 32-1, 32-2.

Figure 5:
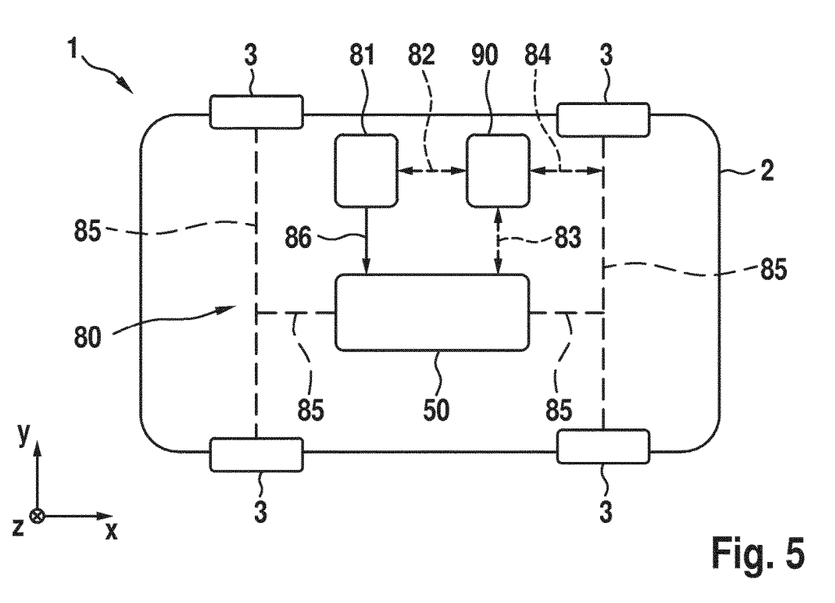
FIG. 5 is a schematic illustration of a vehicle configured according to the invention.

FIG. 5 shows an embodiment of a vehicle 1 according to the invention, using an embodiment of the asynchronous machine 50 for a drive 80.

In the schematic illustration in FIG. 5, the vehicle 1 has a chassis 2 and four wheels 3 which can be driven via a drivetrain 85 by the asynchronous machine 50, constructed according to the invention, in order to propel the vehicle 1. In this context, the vehicle 1 can be a purely electrically driven vehicle or a hybrid vehicle.

The asynchronous machine 50 of the drive 80 is supplied by an energy source, in particular a battery 81, via a supply line 86. The function and operation of the battery 81, the asynchronous machine 50 and the drivetrain 85 are monitored and/or controlled by way of a control unit 90, via control/communication lines 82, 83 and 84.

This and further features and properties of the present invention are explained further with reference to the following.

The rotor 10 of an asynchronous machine 50, which is also referred to as a short-circuit rotor or cage rotor 30, is composed of an iron laminated core 20, comprising laminations which are insulated with respect to one another, and having punched-in grooves 21.

When asynchronous rotors 10 are produced, the short-circuit cage 30 with rods 31 and end rings 32-1, 32-2 can be introduced into the laminated core 20 via an aluminum die casting process.

The cast rotor rods 31 are provided on both sides with short-circuit rings 32-1, 32-2, and therefore form the electrically conductive short-circuit rotor 10.

The efficiency of the electric machine is improved by replacing the aluminum in the die casting process with another suitable material with a higher conductance value such as e.g. copper. The relatively low mechanical strength of the replacement material generally has a disadvantageous effect here.

At high rotational speeds or when there is a large rotor diameter, the short-circuit rings 32-1, 32-2 which are arranged at the axial ends of the laminated core 20 are subjected, owing to centrifugal forces, to the risk of mechanical deformation, as a result of which the rotor 10 can be damaged or destroyed.

In order to counteract this, use is made of support rings 60-1, 60-2 made of mechanically stable materials which absorb the centrifugal forces of the short-circuit rings 32-1, 32-2.

Methods for connecting the support rings to the end rings by bonding, welding or shrink-fitting are costly and mechanically disadvantageous:

(a) In the case of bonded support rings, mechanical processing is necessary in order to generate the bonding gap. Furthermore, the bonding point has to be correspondingly pre-treated to remove impurities, e.g. by cleaning. After the bonding points have been cleaned, the bonding agent has to be applied in a separate fabrication step, wherein the curing period delays the fabrication process. In conjunction with high temperatures, the bonding point is considered to be a weak point both for the connection itself and for the entire fabrication process.

(b) In the case of welded support rings, the selection of materials for the support ring 60-1, 60-2 and short-circuit rings 32-1, 32-2 is limited by the welding capability. The weld spots have to be applied in a separate fabrication step. Welding devices which are necessary for this are expensive. Possible stresses can cause the components to warp.

(c) When support rings are fitted a press-fit is always necessary. Therefore, both the short-circuit ring 32-1, 32-2 and the support ring 60-1, 60-2 must be fabricated very precisely and are also subjected to mechanical processing after the casting, and this is in turn costly and expensive.

In order also to absorb the centrifugal forces of the short-circuit rotor 30 and, in particular, of the short-circuit rings 32-1, 32-2 in the case of high rotational speeds and therefore prevent damage, a new method is provided for mounting the support ring 60-1, 60-2 of a support ring arrangement 60.

A respective support ring 60-1, 60-2 is not to be connected to a short-circuit ring 32-1, 32-2 by bonding, welding or with a press-fit, but instead is to be already connected to the cage rotor 30 in a positively locking and/or materially joining fashion during the casting process of the cage rotor 30, which is carried out in the form of die casting or other casting methods.

The support ring 60-1, 60-2 is located here, in particular already during the casting process, in a mold together with the grooved laminated cores 20.

With respect to application, the support ring 60-1, 60-2 can also be equipped with a contour 61 in order to improve the connection thereof to the cast short-circuit ring 32-1, 32-2.

Therefore, after the die-casting process, the securing of the short-circuit ring 32-1, 32-2 is already concluded, wherein no additional further working step with respect to the attachment of the support ring 60-1, 60-2 is necessary.

Among others, the following advantages are also obtained:

(a) A reduction in untrue running can take place at the support ring 60-1, 60-2. This means that expensive material does not have to be kept available for the balancing process.

(b) As a result of the casting method, the individual tolerances of the components involved are compensated, as a result of which basically respectively higher tolerances are possible than with known methods.

(c) Overall a simple cage rotor 30 which can be fabricated more quickly is obtained. Therefore, the time required for production and the production costs can be reduced

| List of reference numerals: | |
|---|---|
| 1 | Vehicle |
| 2 | Chassis |
| 3 | Wheel |
| 10 | Rotor, Cage rotor |
| 11 | Rotor axis |
| 12 | Rotor shaft |
| 20 | Laminated core |
| 21 | Groove, Recess |
| 30 | Short-circuit cage |
| 31 | Rod |
| 31-1 | (First) end/rod end |
| 31-2 | (Second) end/rod end |
| 32-1 | (First) short-circuit ring |
| 32-2 | (Second) short-circuit ring |
| 40 | Stator |
| 41 | Bearing |
| 50 | Asynchronous machine |
| 60 | Support ring arrangement |
| 60-1 | (First) support ring |
| 60-2 | (Second) support ring |
| 61 | Contour |
| 62 | Recess |
| 63 | Projection |
| 64 | (Convex) outside/outer face |
| 65 | (Concave) inside/inner face |
| 80 | Drive |
| 81 | Battery |
| 82 | Control/communication line |
| 83 | Control/communication line |
| 84 | Control/communication line |
| 85 | Drivetrain |
| 86 | Supply line |
| 90 | Control unit |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A rotor for an asynchronous machine, comprising:
a laminated core; and
a short-circuit cage which is at least partially integrated into the laminated core, wherein
the short-circuit cage comprises
rods made with or from a first electrically conductive material,
short-circuit rings made with or from a second electrically conductive material,
wherein at least one of the short-circuit rings is constructed with a support ring,
wherein a respective support ring is constructed as a structure which is cast onto or into the respective short-circuit ring in at least one of a positively locking and materially joining fashion,
wherein the respective support ring is constructed with, on a surface, a contour for supporting the at least one of the positive locking and the material joining with the respective short-circuit ring, and
wherein the contour has a plurality of projections disposed on an inner surface of the contour inside of a peripheral edge of the contour and projecting radially toward a center of the contour.

2. The rotor as claimed in claim 1, wherein
the respective support ring is constructed entirely or partially on an outer circumference on the respective short-circuit ring and/or is entirely or partially embedded in the respective short-circuit ring.

3. The rotor as claimed in claim 1, wherein
a respective support ring is constructed:
(a) with or from a material from a group of materials comprising metallic materials, ceramic materials and composites, and/or
(b) with or from a same material as the respective short-circuit ring.

4. The rotor as claimed in claim 3, wherein
the materials comprise glass materials and/or carbon fiber materials.

5. The rotor as claimed in claim 1, wherein at least one of the following:
(a) the rods are constructed in or with a cast and/or joined structure,
(b) one or more of the short-circuit rings are constructed as end rings,
(c) the first material has a higher electrical conductivity than the second material,
(d) the second material has a greater mechanical strength and/or stability than the first material, or
(e) the first material and/or the second material is a material from a group comprising aluminum, copper, silver and the combinations and alloys thereof, and wherein the first material is or has copper or a copper alloy, and the second material is or has aluminum or an aluminum alloy.

6. An asynchronous machine for a drive and/or a generator of a vehicle, comprising:
a stator; and
a rotor as claimed in claim 1.

7. A vehicle, comprising:
an asynchronous machine constructed as part of a drive and/or a generator of the vehicle, wherein
the asynchronous machine comprises a rotor as claimed in claim 1.

8. The vehicle as claimed in claim 7, wherein the vehicle is a passenger car, a battery-powered electric vehicle and/or a hybrid vehicle.

* * * * *